(12) United States Patent
Thakkar

(10) Patent No.: US 10,887,302 B2
(45) Date of Patent: Jan. 5, 2021

(54) SECURED REST EXECUTION INSIDE HEADLESS WEB APPLICATION

(71) Applicant: Oracle International Corporation, Redwood Shores, CA (US)

(72) Inventor: Dhiraj D. Thakkar, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 131 days.

(21) Appl. No.: 15/486,996

(22) Filed: Apr. 13, 2017

(65) Prior Publication Data

US 2018/0077137 A1 Mar. 15, 2018

Related U.S. Application Data

(60) Provisional application No. 62/395,346, filed on Sep. 15, 2016.

(51) Int. Cl.
*H04L 29/06* (2006.01)
*H04L 29/08* (2006.01)
*H04L 7/04* (2006.01)

(52) U.S. Cl.
CPC ........ *H04L 63/083* (2013.01); *H04L 63/0815* (2013.01); *H04L 67/141* (2013.01); *H04L 67/02* (2013.01)

(58) Field of Classification Search
CPC . H04L 63/083; H04L 63/0815; H04L 67/141; H04L 67/02; H04L 63/0807; H04L 63/0884; H04L 29/06768; G06F 21/41

(Continued)

(56) References Cited

U.S. PATENT DOCUMENTS 7,562,382 B2 * 7/2009 Hinton ................ H04L 63/0815
  709/225
7,747,856 B2 * 6/2010 Favazza .............. H04L 63/0807
  713/168

(Continued)

OTHER PUBLICATIONS

Ip.com PAD. "Method and System for Mobile Hybrid Application Single Sign-on using Delegated Credentials", Mar. 2013. (Year: 2013).*

(Continued)

*Primary Examiner* — Michael Simitoski
(74) *Attorney, Agent, or Firm* — Trellis IP Law Group, PC

(57) ABSTRACT

A system and method for facilitating establishing a secure connection between a client application and a content provider. An example method includes employing a security gateway to authenticate a client for communications therewith; maintaining, for the client, security credentials for a data provider via a security configuration module, wherein the security credentials are associated with a description of data, which is associated with a data provider; using the gateway to determine which of the security credentials to use to fulfill the request message received by the security gateway from the client based on the request; and employing the selected security credentials to selectively retrieve data from and deliver the data to the client application. The example method may further include generating the request message when a User Interface (UI) control displayed in a UI display screen of a browser client is selected or activated.

19 Claims, 7 Drawing Sheets

(58) Field of Classification Search
USPC .......................................................... 726/6
See application file for complete search history.

(56) References Cited

U.S. PATENT DOCUMENTS

| | | | | |
|---|---|---|---|---|
| 8,601,134 | B1* | 12/2013 | Sorenson, III | H04L 67/2842 709/227 |
| 8,973,118 | B2* | 3/2015 | Fitzpatrick, III | H04L 9/3213 726/7 |
| 9,037,735 | B1* | 5/2015 | Fallows | H04L 67/42 709/228 |
| 9,276,933 | B2* | 3/2016 | Sng | H04L 63/0807 |
| 2006/0234730 | A1* | 10/2006 | Bibr | H04L 67/04 455/466 |
| 2010/0306547 | A1* | 12/2010 | Fallows | G06F 21/305 713/178 |
| 2011/0041171 | A1* | 2/2011 | Burch | H04L 63/0281 726/7 |
| 2013/0275510 | A1* | 10/2013 | Middleton | H04L 67/28 709/204 |
| 2013/0346475 | A1* | 12/2013 | Jasperson | G06F 16/95 709/203 |
| 2014/0007215 | A1* | 1/2014 | Romano | H04L 63/0281 726/12 |
| 2016/0119289 | A1* | 4/2016 | Jain | H04L 63/0281 726/12 |
| 2017/0048319 | A1* | 2/2017 | Straub | H04W 12/0027 |
| 2018/0077142 | A1* | 3/2018 | Thakkar | G06F 21/00 |
| 2018/0295190 | A1* | 10/2018 | Lu | H04L 67/141 |

OTHER PUBLICATIONS

Xiang-Wen Huang, Chin-Yun Hsieh, Cheng Hao Wu and Yu Chin Cheng, "A Token-Based User Authentication Mechanism for Data Exchange in RESTful API," 2015 18th International Conference on Network-Based Information Systems, Taipei, 2015, pp. 601-606, doi: 10.1109/NBiS.2015.89. (Year: 2015).*

Kerberos (see Wikipedia) (https://en.wikipedia.org/wiki/Kerberos_(protocol))—8 pages—Downloaded Feb. 10, 2017.

Single Sign-On technologies (see Wikipedia), e.g., XOpen SSO PAM. (https://www.uoguelph.ca/ccs/security/internet/single-sign-sso/benefits)—2 pages—Downloaded Feb. 10, 2017.

Pluggable Authentication Module (PAM) (-see Wikipedia article for references at the bottom-), e.g., JaaS. (https://en.wikipedia.org/wiki/Java_Authentication_and_Authorization_Service).—5 pages—Downloaded Feb. 10, 2017.

* cited by examiner

SECURED REST EXECUTION INSIDE HEADLESS WEB APPLICATION

CROSS REFERENCES TO RELATED APPLICATIONS

This application claims priority from U.S. Provisional Patent Application Ser. No. 62/395,346, entitled SECURED REST EXECUTION INSIDE HEADLESS WEB APPLICATION filed on Sep. 15, 2016 (ORACP0191P) which is hereby incorporated by reference as if set forth in full in this application for all purposes.

This application is related to the following application, U.S. Provisional Application Ser. No. 62/395,341, entitled SYSTEM FOR PROCESS CLOUD SERVICE, filed on Sep. 15, 2016 (Trellis ref ORACP0192P/Client ref. ORA170390-US-PSP), which is hereby incorporated by reference as if set forth in full in this application for all purposes.

BACKGROUND

The present application relates to computing, and more specifically to systems and methods for facilitating secure communications between a client application and one or more data providers that may employ different authentication technologies than the client and/or other data providers with which the client is to communicate.

Systems and methods for facilitating authentication of client applications to enable access to secure data maintained by data providers are employed in various demanding applications, including enterprise, government, and university computing environments. Such applications often demand cost-efficient mechanisms for efficiently integrating software applications with data providers that handle sensitive data and/or functionality.

Conventionally, in a first example client-server model, a browser or mobile application browses to a website of a content provider maintained on a web server. The website then provides website content, which is loaded into the UI display screen of the browser to populate various UI sections or elements thereof. In such scenarios, the website content is often public.

In a second example client-server model, the website includes webpage code that selectively calls another web application, web service, or Application Programming Interface (API) to retrieve data from a backend content provider (also called data provider herein) to populate, with content, UI elements of a displayed webpage as needed.

However, in cases wherein the data provider requires user authentication before providing requested data, each web application attempting to access data from the data provider must be authenticated, e.g., by providing one or more credentials, e.g., username, password, certificate, and so on. This requires that each client application be fully security aware. Each client application must account for various different ways of fetching data from the data provider.

Conventionally, an application developer must incorporate such security functionality into the client application. If plural client applications must communicate with the same data provider, then each such client application must typically handle security information independently.

Accordingly, although the above client-server model provides security, it can be costly for developers to incorporate the complicated security functionality required to access external data from various data providers that require authentication of client applications before providing access to the data.

SUMMARY

An example method facilitates securely connecting (e.g., via authentication) a client application with one or more content providers (also called data providers herein). The example method includes storing one or more credentials associated with a client application as security configuration information that is accessible to a server, e.g., via a security gateway, wherein the one or more credentials are usable to access data from a data provider; receiving a request message from the client application; loading security information associated with the client application based on analysis of the request message; and using the security information to selectively retrieve and deliver data from the data provider to the client application in accordance with the request message.

In a more specific embodiment, the example method further includes receiving the request message at a data gateway (also called security gateway herein) running on a server that is in communication with the data provider. The request message is associated with one or more User Interface (UI) elements of a UI display screen presented via a browser, which may act as the client application. Alternatively, or in addition, another web application acts as the client application.

The step of loading security information further includes analyzing the request message to determine a data provider that is associated with the request message. The analysis includes using content of the request message to determine a common configuration to associate with the request message. The common configuration may include information specifying a data provider for which the security information is usable to log into the data provider. The security information may include, for example, a password, subscriber ID, certificate, and/or other credentials or identifiers.

In another embodiment, the example method includes connecting a UI element of a website displayed in a UI display screen of the client application to the security gateway; connecting the security gateway to an enterprise application; loading the security information from a security configuration module into the security gateway, wherein the security information includes one or more credentials associated with a user of the client application; using the security gateway to issue a call to the data provider to transfer data responsive to the request message to the client application; and using the client application to populate the UI element with the data that has been transferred from the data provider.

Accordingly, various embodiments discussed herein may involve moving security handling functionality to a data gateway, thereby simplifying software application development, e.g., development of enterprise web applications for use in cloud computing environments. An administrator, as opposed to a developer, can now readily and efficiently configure security functionality in an accompanying computing environment.

Furthermore, additional flexibility is afforded to enterprises, since if an enterprise decides to switch to using a different data provider for their enterprise applications, a transition to the new data provider no longer requires modifying enterprise application code. By using certain embodiments discussed herein, such a migration to a different data provider can be readily performed by merely adjusting configuration information, e.g., common configuration information identifying the new data provider (e.g., by updating the URL associated therewith) and security configuration information indicating one or more authentication credentials.

A further understanding of the nature and the advantages of particular embodiments disclosed herein may be realized by reference of the remaining portions of the specification and the attached drawings.

DETAILED DESCRIPTION OF EMBODIMENTS

Figure 1:
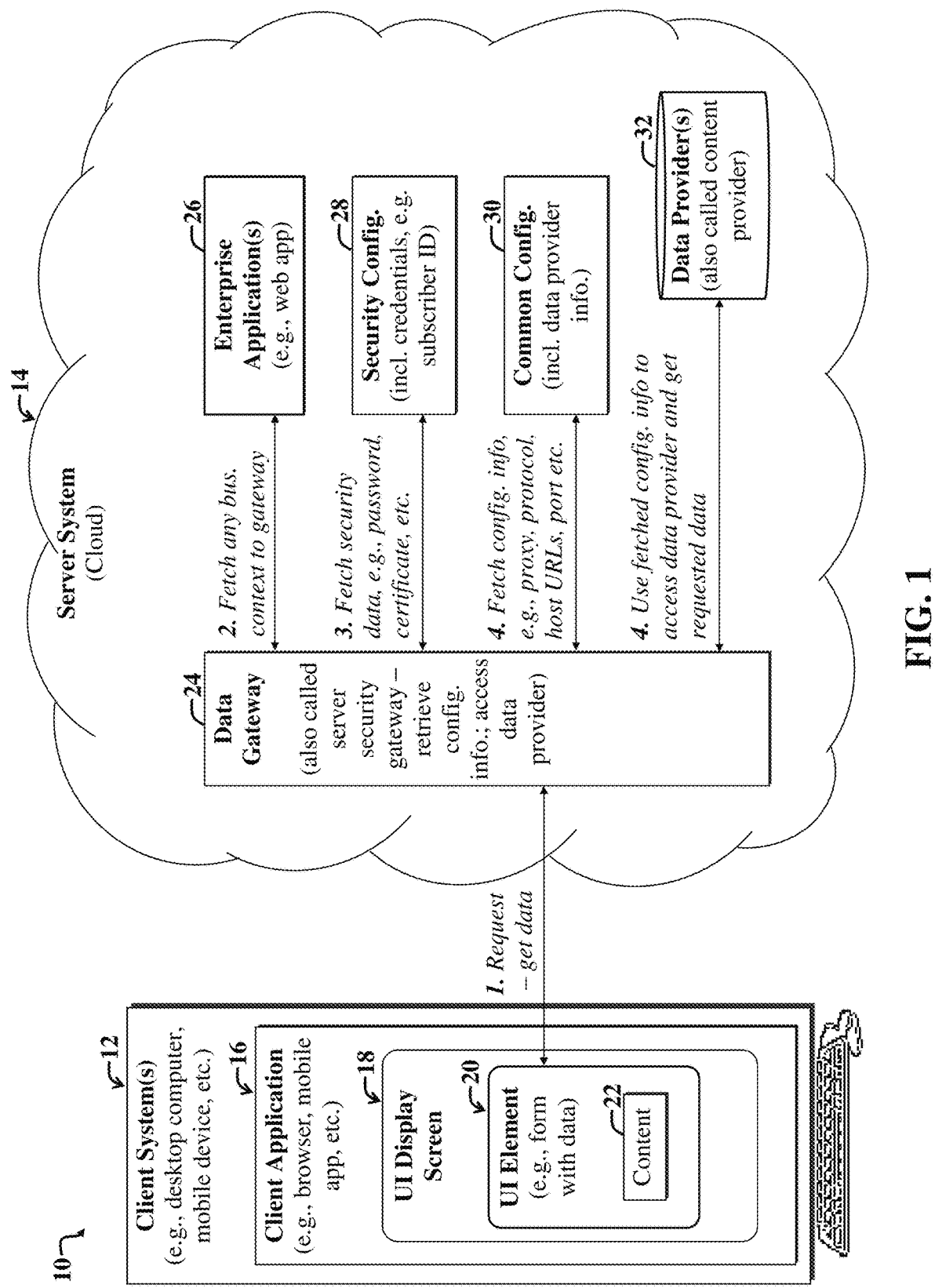
FIG. 1 is first a block diagram illustrating a first example system and accompanying computing environment configured to facilitate authentication of client applications for communications with one or more secure data providers using pre-stored configuration information accessible to a data gateway.

In many computing environments, e.g., enterprise computing environments, different software applications or other computing resources require authentication before allowing communications therewith, where the communications involve the sharing of confidential or secret data and/or software functionality. For the purposes of the present discussion, a secure connection may be any connection that requires some form of authentication to verify the identity of a client using the connection.

For example, a cloud-based software development application may provide a shared collaborative development environment involving multiple actors, e.g., users and associated software applications and/or accompanying secure computing sessions. If a first software development application must connect to a second software application via a secure connection, then the first software application and the second software application may require use of a mutually compatible secure mechanism, i.e., authentication technology, for sharing information that can be used for authentication.

Accordingly, various embodiments discussed more fully below relate to the use of tokens and interfacing mechanisms for selectively using the tokens and/or associated message data to retrieve credentials, common configuration information, enterprise application context information, and so on, to facilitate retrieval of data from a data provider. For the purposes of the present discussion, a security token may be any collection of data, e.g., user name, time stamp, etc. that may be employed to facilitate identifying a software application and/or associated user of and/or session of the software application, so as to facilitate confirming an identity of the software application and/or user, i.e., so as to facilitate authentication thereof. A secure token may be any encrypted token.

For the purposes of the present discussion, an enterprise may be any organization of persons, such as a business, university, government, military, and so on. The terms "organization" and "enterprise" are employed interchangeably herein.

An enterprise computing environment may be any collection of computing resources of an organization used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

Enterprise software may be any set of computer code that is adapted to facilitate implementing any enterprise-related process or operation, such as managing enterprise resources, managing customer relations, and so on. Example resources include Human Resources (HR) (e.g., enterprise personnel), financial resources, assets, employees, business contacts, sales data, and so on, of an enterprise. Examples of enterprise software include Enterprise Resource Planning (ERP) software for facilitating managing enterprise activities (e.g., product planning, inventory management, marketing, sales, and so on) and Integrated Development Environment (IDE) software for facilitating development of software applications. Example ERP applications include Customer Relationship Management (CRM), Human Capital Management (HCM), Business Intelligence (BI), enterprise asset management, enterprise asset management, corporate performance and governance applications, and so on.

The terms "enterprise software," "enterprise application," and "business application" may be employed interchangeably herein. However, an enterprise application may include one or more enterprise software modules or components, such as UI software modules or components, which may also be called software applications. In general, for the purposes of the present discussion, a software application may be any collection of computer code for implementing particular software functionality. Accordingly, web services, Application Programming Interfaces (APIs), database management systems, interface modules, browsers, Business Process Execution Language (BPEL) templates, and so on may be considered software applications for the purposes of the present discussion. The terms "software application" and "application" may be employed interchangeably herein.

Software functionality may be any function, capability, or feature, e.g., stored or arranged data, that is provided via computer code, i.e., software. Generally, software functionality may be accessible via use of a user interface (UI), and accompanying user interface controls and features. Software functionality may include actions, such as retrieving data pertaining to a business object; performing an enterprise-related task, such as promoting, hiring, and firing enterprise personnel, placing orders, calculating analytics, launching certain dialog boxes, performing searches, compiling computer code, interfacing other software applications (e.g., as may be performed by middleware and associated APIs), and so on.

In an example computing environment, as discussed more fully below, multiple clients may wish to communicate with a particular application, e.g., a web application or other server-side application, e.g., a database management system of a data provider. However, each client, and the server-side application may not be using the same shared authentication technology or system. Conventionally, mechanisms for securely interfacing with a secure data provider are handled independently by each client application seeking to retrieve content from the secure data provider. However, this can complicate software development and can require costly software changes when migration to new data providers is required. Various embodiments discussed herein provide efficient mechanisms for effectively offloading handling of communications between client applications and content providers to an easily configurable system.

The example computing environment may include an application server that supports the running of various software applications, including data providers. When a user (where the term "user" may refer to a particular software application, communication session, and/or associated human user, depending upon the context in which the term is used) logs into a server-side software application (and is authenticated thereby) running on an application server, the application server may set the identity of the user so as to enable user access to (and use of) data and functionality afforded thereto in accordance with one or more permissions associated with the user, i.e., associated with the user's identity represented by one or more credentials, e.g., username.

For the purposes of the present discussion, a server may be any computing resource, such as a computer and/or software that is adapted to provide content, e.g., data and/or functionality, to another computing resource or entity that requests it, i.e., the client. A client may be any computer, software application, or system that is adapted to receive content from another computer, software application, or system, called a server.

A Service Oriented Architecture (SOA) server may be any server that is adapted to facilitate providing services accessible to one or more client computers coupled to a network. The terms "client," "client application," and "client software application," may be employed interchangeably herein when referring to software that issues one or more request messages that are addressed to another computing resource, called the server-side application herein. The term "client device" as used herein refers to the computer hardware and accompanying client software application(s) running thereon or therein.

Similarly, depending upon the context in which the term is used, the term "server" may refer to a combination of hardware and software, or may refer to software that supports the running of server-side applications and may include a collection of one or more servers, i.e., a server system, as may be implemented as one or more server domains.

An application server may be a software framework (and/or hardware that supports the software framework, depending upon the context in which the term is used) for providing computing resources for supporting the creation of and running of software applications, e.g., web applications, including web services, APIs, database applications, and so on, that provide data and/or functionality to other software applications, called client applications.

Various embodiments discussed more fully below provide mechanisms and accompanying methods enabling efficient retrieval of data (e.g., for use in displaying webpage content) from a data provider using a data gateway to handle security-related information, thereby offloading the need for developers of individual software applications to incorporate special code to handle various use cases that may involve retrieval of data from different data providers that may require use of data access credentials to enable access to the data afforded thereby.

For clarity, certain well-known components, such as hard drives, processors, operating systems, power supplies, routers, Internet Service Providers (ISPs), identity management systems, workflow orchestrators, process schedulers, integration brokers, Tenant Automation Systems (TASs), OnLine Analytical Processing (OLAP) engines, certain web services, virtual machines, middleware, enterprise databases, and so on, are not necessarily explicitly called out in the figures. However, those skilled in the art with access to the present teachings will know which components to implement and how to implement them to meet the needs of a given implementation.

FIG. 1 is first a block diagram illustrating a first example system 10 and accompanying computing environment configured to facilitate authentication of client applications 12 for communications with one or more secure data providers 32 using pre-stored configuration information 26-30 that is accessible to a data gateway 24, also called a security gateway herein.

For the purposes of the present discussion, a security gateway may be any software application that provides message routing or interfacing functionality and security functionality for facilitating authenticating a client application or user thereof based on one or more messages received from the client application. The security functionality may include, for example, retrieving one or more stored credentials for the client application for subsequent use in logging into a data provider using the credentials.

Secure data of a data provider and/or accompanying database may be any data that requires authentication to enable data access, i.e., requires identification of the client and/or account associated therewith. Similarly, a data provider that selectively provides secure data is called a secure data provider herein.

In the present example embodiment, one or more client devices 12 (also called client systems herein) run a client application 16 (e.g., a browser 16 or mobile device application), in communication with one or more servers 14 (called the server system 14 herein) via a network, such as the Internet. The one or more servers 14 host the data gateway 24, which acts as a communications interface between the client system 12 on one side, and one or more enterprise applications 26, a security configuration module 28, a common configuration module 30, and one or more data providers 32 on the other side.

Accordingly, communications between the client system 12 and modules 24-32 of the server system 14 are first routed through the data gateway 24. Note however, that while the data gateway 24 interfaces the client system 12 with other server side modules 26-32, that the positioning of the gateway may be altered, without departing from the scope of the present teachings. For example, in certain alternative implementations, as discussed more fully below with reference to FIG. 2, the client system 12 first connects to a website hosted on a web server and backed by a web application that acts as the client application (on behalf of the first client application 16), which is then communicates with one or more application servers 14 and accompanying modules 26-32 via the gateway 24.

In the present example embodiment, the client application 16 provides a UI display screen 18 for displaying content via one or more UI elements 20. A UI element may be any section of (or UI control of) a UI display screen that is used to display or otherwise access, view, or enable user interaction with content, i.e., data. For example, the UI element 20 may correspond to a displayed shipping label, wherein the UI element is to display content 22 applicable to the particular shipping label when the client application 16 browses to a website that uses or is implemented via the enterprise application 26 of FIG. 1.

For the purposes of the present discussion, a UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display. The terms UI display screen and screen may be employed interchangeably herein.

A UI display screen generated by a networked software application and accessible via a browser is called an application page (or simply page) herein. A UI component may be an application page or collection of related or linked pages.

For the purposes of the present discussion, a UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, the data gateway 24 may act as a front end interface used by one or more application servers. The client application 16 may communicate with the enterprise applications via another web application hosted on a web server, where communications between the web server and the enterprise application 26 are selectively routed through the data gateway.

Furthermore, in certain use case scenarios, the enterprise application 26 may act as a client to the data provider 32, without requiring code associated with the enterprise application 26 to run on a client-side browser or mobile application 16. For example, data from the data provider 32 may be used in one or more calculations of the enterprise application 26, wherein the results of the calculations are not necessarily then directly contained in a particular UI element 20.

Note that in certain implementations, the client system(s) 12 may not use the enterprise application 26, but may instead be used to log into the data provider 32, which may include functionality for serving content to the authenticated client application 16 without use of the enterprise application 26.

Note that while the data provider 32 is shown running on the same server system 14 as the data gateway 24, the enterprise application 26, and the configuration modules 28, 30, embodiments are not limited thereto. For example, the data provider 32 may run on an external server system or server domain that communicates with the server system 14 via the data gateway 24.

In a first example scenario, a system administrator has preconfigured the security configuration module 28 with one or more credentials, i.e., identifying information, usable to authenticate the client application 16 for access to content of the data provider 32, so as to enable retrieval of the content 22 (by the client application 16) for subsequent display in the UI element 20 of the UI display screen 18 of the client application 16. Examples of secret security information that may be stored at the security configuration module 28 include subscriber ID, password, client application certificate, and so on. Note that exact details as to which type of security information is used, are implementation specific and may vary, without departing from the scope of the present teachings.

The administrator has also configured the common configuration module 30 with information describing the data provider 32. Examples of information describing the data provider 32 include host Uniform Resource Locator (URL), port, protocol used, proxy server information, and so on. Generally, the information maintained by the common configuration module 30 is not secret or confidential, whereas secret information, e.g., password, is maintained at the security configuration module 28.

For the purposes of the present discussion, a common configuration may be a collection of any information that describes a data provider, e.g., data provider name, URL address, and so on, or that otherwise does not represent user authentication information but may be usable to determine how to route a request message received from a client. A data provider may be any computing resource that is configured to selectively provide data in response to a request.

In the present example scenario, a user of the client system 12 browses to a Uniform Resource Locator (URL) for the enterprise applications 26, which then serves a webpage corresponding to the UI display screen 18. The UI display screen 18 includes a UI element 20, which is to display content 22 that is to be retrieved from the data provider 32. When the UI element 20 begins to load, and/or when a user selects a UI control to begin the loading, this triggers a sequence of steps to enable retrieval of the content 22 from the data provider 32.

An example sequence of steps includes issuance of a request message associated with the UI element 20. The UI element 20 connects to the data gateway 24 and delivers the request message for the content 22 thereto. The request message includes a token identifying the client application 16 and/or associated user session thereof.

The user session may include a session with the enterprise application 26. The token may be generated by the enterprise application 26 to which the user logged into before interacting with the enterprise application 26 to trigger display of the UI display screen 18 and accompanying UI element 20 to be populated with content 22 retrieved from the data provider 32. Alternatively, the token is generated by the client application 16.

The data gateway 24 analyzes the request message (including analysis of the token and message payload) and fetches any business context information related to the request message from the enterprise application 26. Security data maintained by the security configuration module 28 is indexed according to client application or user session thereof via different tokens that are registered with the security configuration module 28.

Accordingly, the particular security information applicable to the client application 16 is retrieved and loaded (e.g., into cache or file maintained at the data gateway) by the data gateway 24 from the security configuration module 28 using the token of the request message associated with the UI element 20. The token may be included as a header in the request message sent from the client application 16 to the data gateway 24.

The data gateway 24 then uses the token and analysis of the request message to select a set of configuration information that is applicable to the request message. The configuration information may indicate, for example, the URL of the data provider 32.

After the data gateway 24 fetches the security data from the security configuration module 28; configuration information from the common configuration module 30; and any additional context made available by the enterprise application 26, then the fetched information is used by the data gateway 24 to log into or otherwise access data from the data provider 32 that is applicable to the request message.

In summary, the UI element 20 connects to the data gateway 24. The data gateway 24 then connects to the software application, e.g., enterprise application 26, to get any business context. The data gateway 24 then loads security data from the security configuration module 28, e.g., password, certificates, etc. Also, the data gateway 24 loads other configuration items, e.g., proxy, additional handshake protocol, etc., from the common configuration module 30. With all of this information, the data gateway 24 then makes a call to the data provider 32, i.e., issues a request message (4.) thereto so as to fulfill the request message (1.) sent by the client application 16.

Note that the data provider 32 can be running on the same server or server system as the software application 26, which may be connected to the Internet, intranet, or other network. The data provider 32 may use a certificate or password for authentication and may need additional header information, e.g., token, to validate the caller, i.e., data gateway 24 and associated client application 16. Since all the security handling is now in the data gateway application 24, the business applications 26 are simplified. A system administrator may configure security (e.g., in party by specifying contents of the common configuration module 30) without relying upon a developer to incorporate the security functionality entirely in the enterprise application 26 and/or in the client application 16.

In a more specific example use case scenario, an application developer designs an enterprise application 26 that serves a UI display screen 18 with a first UI element 20. The first UI element 20 needs to fetch data for a shipping label from https://acme.com/shippingLabel. The acme.com requires the enterprise application 26 to provide a secret subscriber ID in addition to providing some basic information, e.g., name, address, type of package, etc.

A UI application running in the browser 16 or mobile client makes a request to the data gateway 24. The request includes, for example, the following data: name, address, package information, etc. (common information); and request type: "getShippingLabel."

The common configuration (as maintained via the common configuration module 30) includes, for example, the data provider information for getShippingLabel operation, i.e., to respond to the request, wherein the data provider information includes host, port, protocol, proxy information, etc. The security configuration information (as maintained via the security configuration module 28) includes, for example, a secret subscriber ID.

Next, the data gateway 24 (also called security gateway or gateway application herein) checks the common configuration 30 to find the data provider 32 for "getShippingLabel." The gateway application 24 then checks the security configuration 28 and finds the secret subscriber ID and then makes a call to the data provider 32 to generate the shipping label. The shipping label is then shown in the client application 16 as the UI element 20 and accompanying shipping-label content 22 retrieved from the data provider 32.

Hence, development of software applications that are to be integrated with data providers that require authentication is greatly simplified. To enable such integration, the application designer will know that a shipping label is to be generated, but the application designer need not be concerned with incorporating special integration functionality into the enterprise application 26 to interface with the secure data provider 32.

Optionally, the application designer populates the common configuration module 30 with information about the data provider 32, which is not secret, i.e., may be public. The system administrator then configures common configuration module 30 to set common information for the shipping label provider 32 and also configures the security configuration module 28 to associate the secret subscriber ID (or any other information needed by the data provider 32) with the particular data provider 32.

The data gateway application 24 then securely processes the request on behalf of the client application 16 and returns the data to the client application 16. This simplifies the business application development and facilitates keeping control of system level details and confidential information in the hands of system administrators.

If a company later decides to use a different label provider, then no changes are required in the business application 26. Only the configuration 28, 30 and system configuration of the gateway 24 may need to be updated.

Accordingly, in summary, in the present example embodiment, instead of having the browser or other client application 16 connect directly to the enterprise application 26 (also called business application herein) and/or data provider 32, the browser 16 connects through the data gateway application 24.

The data gateway 24 may access data on behalf of any business application connected thereto. Accordingly, the UI element 20 connects to the data gateway 24 to communicate with an individual business application 26 and/or data provider 32.

The UI element 20 may be associated with one or more tokens (e.g., T1). Another client system using another client application may display yet a different UI element may be associated with a different token (e.g., T2).

The data gateway 24 includes code for using the token information to facilitate determining which business application 26 is being used by the browser 16; which security configuration is being used; and what other information (e.g., common configuration data 30) may be needed to retrieve data from the data provider 32 so as to fulfill the data request and populate the UI element.

The data gateway 24 then connects to the derived data provider 32 using the security information; any additional headers obtained from the common configuration module 30; any additional context information, e.g., URLs used by the enterprise application 26 to identify applicable data providers 32, and so on.

Accordingly, developers of enterprise applications 26 no longer need to be concerned with how to store username and password configuration information. Furthermore, when passwords change, the associated configuration can also change. Since security related tasks are not relegated to the data gateway, associated security configuration can now be administered by an administrator, e.g., common cloud administrator. If data providers change; a department ID changes, a subscriber ID changes, etc., enterprises no longer need to modify and reload their enterprise applications to accommodate the changes, thereby reducing business expenses. Each business application 26 running on the cloud 14 can now selectively and securely access secure data afforded by the data provider(s) 32.

Figure 2:
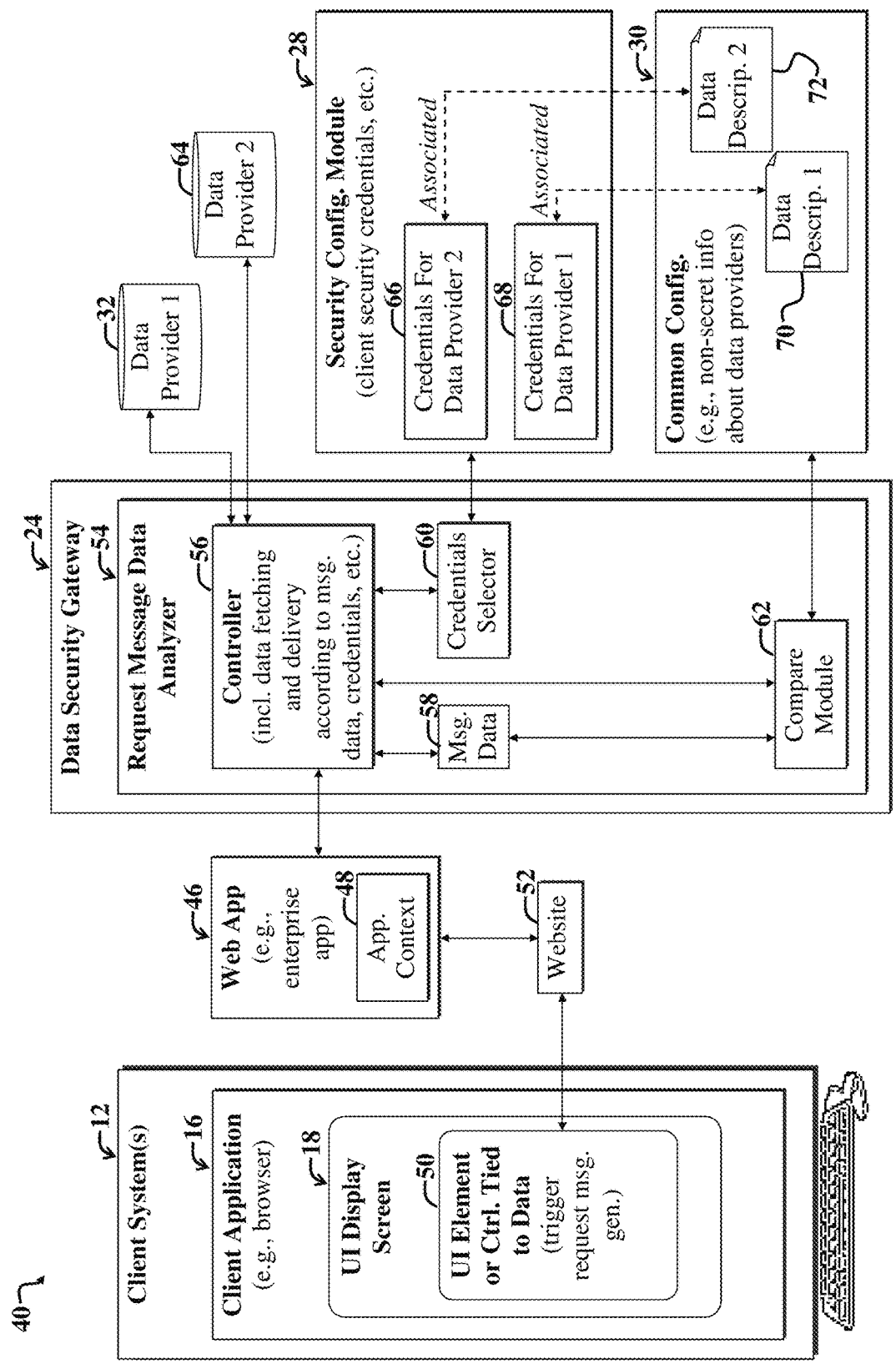
FIG. 2 is a second block diagram illustrating an alternative example embodiment, wherein request messages for content triggered via a browser are routed through a web application before being routed through the data gateway.

FIG. 2 is a second block diagram illustrating an alternative example embodiment, wherein request messages for content triggered via a browser or mobile application 16 are routed through a web application 46 before being routed through the data security gateway 24.

In the present example embodiment, the data security gateway 24 may provide a front end interface for an application server or server system (e.g., server domain) that also hosts or otherwise fronts data providers 32, 64; the security configuration module 28 and accompanying stored credentials or other identity-related information 66, 68 usable for the different data providers 32, 64; and the common configuration module 30.

The client application 16 presents a UI display screen 18 with an accompanying UI element or UI control 50 that is tied to data from the first data provider 32 or the second data provider 64. For the purposes of the present discussion, a UI element is said to be tied to data if the data or portion thereof or derivative thereof is to be displayed in a region of the UI display screen 18 corresponding to the UI element. Similarly, a UI control is said to be tied to data if user selection of the control results in generation of a request message to retrieve the data from a data provider, e.g., website host or backend database management system and accompanying database.

The UI display screen 18 represents a webpage of a website 52 that is backed by a web application 46. The website 52 and web application 46 may run on a web server that communicates with an application server that hosts the data security gateway 24.

The web application 46 may represent an enterprise web application that is to selectively access data of the first data provider 32 and/or the second data provider 64 depending upon application context 48. The web application 48 may maintain application context, e.g., information describing state information of the web application 46. For example, the state information may indicate that the currently displayed page is a form pertaining to shipping, and that a currently displayed UI display screen 18 presents shipping information pertaining to a particular user session established between the client application 16 and web application 46.

The example data security gateway 24 includes a request message data analyzer 54 for analyzing request messages (and associated information, e.g., tokens routed from the web application 46) seeking information from one or more data providers 32, 64.

A controller 56 of the request message data analyzer 56 handles and routes communications between various other modules, including a data-compare module 62, a credentials selector module 60, and the data providers 32, 64.

The security configuration module 28 maintains a first set of one or more preregistered credentials 66 for the first data provider 32 and a second set of one or more preregistered credentials 68 for the second data provider 64. Note that the different sets of credentials 66, 68 are each associated with respective data descriptions 70, 72, which describe or otherwise characterize the types of (or nature of) data available from the data providers 32, 64 via use of the different credentials 32, 64.

Note that the various sets of credentials 66, 68 may also be associated with particular client application(s) 16 or sessions thereof that have been established between the client application 16 and web application 46. Such associations may be performed using one or more tokens issued by the web application 46, wherein the one or more tokens identify the client application(s) 16 or session(s) thereof.

In an example use case scenario, the data security gateway 24 has authenticated a client application 16 and associated session of web application 46 for communications with the data security gateway 24. Note the web application 46 may also be considered as a client of the one or more data providers 32, 64, to the extent that the web application 46 will be performing data retrieval functions from the data providers 32, 64 in response to one or more request messages received from the client 16 of the web application 46.

Accordingly, when discussing the embodiment of FIG. 2, the term "client application" may collectively refer to the client application 16 and the associated web application 46.

The client applications 16, 46 are associated with or provide a collection of one or more server-side security credentials 66, 68 for one or more data providers 32, 64. The credentials 66, 68 and the data providers 32, 64 are each associated with corresponding descriptions of data 70, 72. Accordingly, each set of one or more credentials 66, 68 is associated with a description of data 70, 72, which may also describe or characterize the respective data provider 32, 64. The credentials 66, 68 and the data descriptions 70, 72 are accessible to the data security gateway 24 via the security configuration module 28 and common configuration module 30, respectively.

The data security gateway 24 uses the request message data analyzer 54 to determine which credentials 66, 68 to use for which request based on information in the request message 58 (e.g., token, message payload, etc.) and associated contents in the common configuration module 28. The compare module 62 includes code for comparing the message data 58 with data in the common configuration module 70, 72 to thereby enable code running on the credentials selector 60 to determine which set of credentials 66, 68 to fetch and load so to fulfill a particular request message from the client application 18, 46.

The data security gateway 24 then uses the identified credentials to selectively retrieve data from the determined data provider 32, 64, and to then deliver retrieved data to the client application 46 and/or other business application to fulfill the request message.

Note that conventionally, business logic for handling usernames, passwords, and other credentials used to access data of a data provider are embedded in the web application 46, e.g., business application. The web applications would typically require use of complex adapters for handling various types of information from different data providers. For example, a special adapter may be employed to retrieve information from Facebook, and another adapter may be used for LinkedIn. Problems with performing such costly integration steps involved in modifying web applications to handle various security-related tasks, e.g., authentication for accessing data from secure data providers, are substantially eliminated via use of systems and methods discussed herein.

Figure 3:
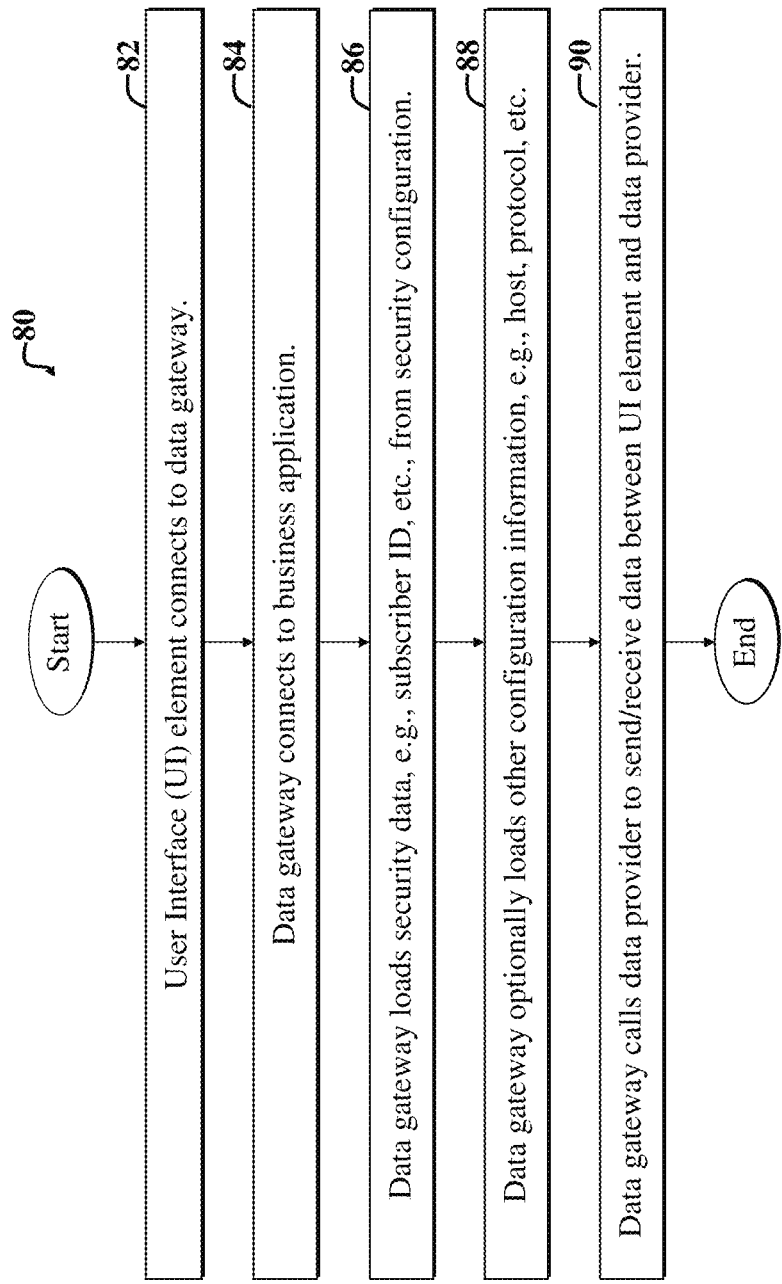
FIG. 3 is a flow diagram of a first example method implementable via the embodiments of FIGS. 1-2.

FIG. 3 is a flow diagram of a first example method 80 implementable via the embodiments of FIGS. 1-2. The first example method facilitates secure transfer of data between a UI element and a data provider. A first UI-element-connecting step 82 includes connecting the UI element to a data gateway application.

A second data-gateway-connecting step 84 includes connecting the data gateway application to a business application.

A third data-loading step 86 includes loading security data from a security configuration to the data gateway.

A fourth data-loading step 88 includes optionally loading other configuration information, e.g., host URL identifying the data provider, protocol used to communicate with the data provider, and so on.

A fifth data-retrieving step 90 includes using the data gateway to make calls to the data provider to enable transfer data between the UI element and the data provider via the data gateway.

Note that the example method 80 may be modified, without departing from the scope of the present teachings. For example, the method 80 may be modified to state that the second data-gateway-connecting step 84 that the data gateway retrieves business context information describing the currently running the enterprise application or session thereof, wherein the context information is then further used to facilitate selecting and/or confirming that a particular data provider is intended to be used to fulfill a request message generated in association with the UI element.

Figure 4:
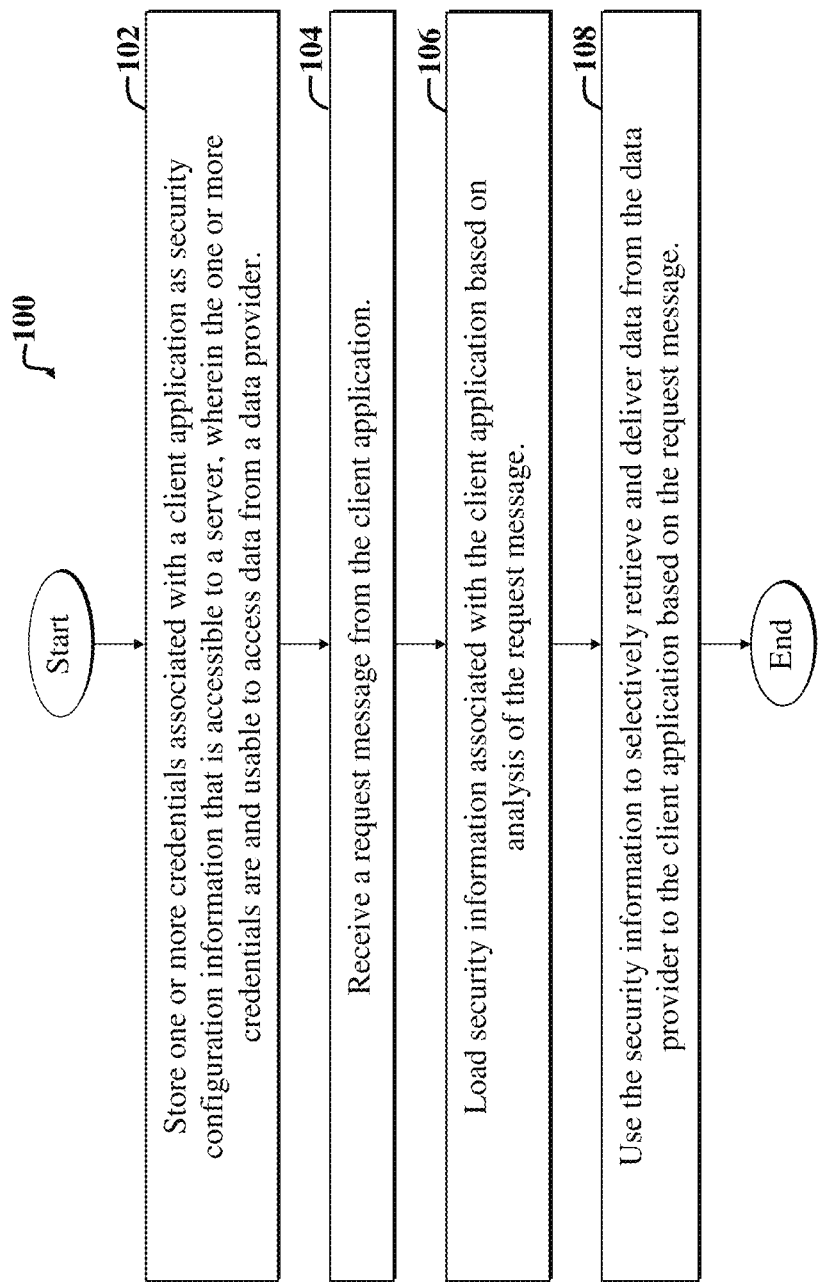
FIG. 4 is a flow diagram of a second example method implementable via the embodiments of FIGS. 1-2.

FIG. 4 is a flow diagram of a second example method 100 implementable via the embodiments of FIGS. 1-2. The second example method 100 facilitates securely connecting a client application with a data provider and includes a first credentials-storing step 102, which involves storing one or more credentials associated with a client application as security configuration information that is accessible to a server, wherein the one or more credentials are usable to access data from a data provider.

A second message-receiving step 104 includes receiving, e.g., at a server-side data gateway, request message from the client application.

A third information-loading step 106 includes loading security information associated with the client application based on analysis of the request message. Note that loading security information may further include using a token that is included in or associated with the request message. The token includes information that indicates a web application that is used by the client application.

A forth information-using step 108 includes using the security information to selectively retrieve and deliver data from the data provider to the client application based on the request message and/or information associated therewith. The fourth information-using step 108 may further include using the token to retrieve configuration information pertaining to the web application that the client application (e.g., browser) is communicating with or is to communicate with.

Note that the term "security information" as used with reference to the method of FIG. 4 is not limited to credentials or other secret data, but may include common configuration information and information pertaining to a web application, (e.g., the enterprise application 26 of FIG. 1) which may include, for example, information about handshake protocols, web application state or other context, web application URL, and so on.

The security gateway may use token information received from a client to determine which web application (e.g., enterprise application) is being used by the client (e.g., browser); which security configuration is being employed by the client, and any other information that may be required to identify and get data from a particular data provider.

Note that the second example method 100 may be modified, without departing from the scope of the present teachings. For example, the method 100 may be modified to further specify that the second message-receiving step 104 further includes receiving the request message at a security gateway running on a server that is in communication with the data provider.

The request message may be associated with one or more UI elements of a UI display screen that is presented via a browser, which may represent the client application. Alternatively, or in addition, the browser may communicate with another client application, e.g., a web application that is used to access another enterprise application (e.g., the enterprise application 26 of FIG. 1), which in turn connects to the data provider via the data gateway to retrieve data for sending back to the web application and on to the browser client.

The third information-loading step 106 may further include analyzing the request message to determine a data provider that is associated with the request message, wherein analyzing the request message includes using content of the request message to determine a common configuration to associate with the request message. The common configuration includes information specifying a data provider for which the security information, e.g., username, password, subscriber ID, etc., is usable to log into the data provider.

Figure 5:
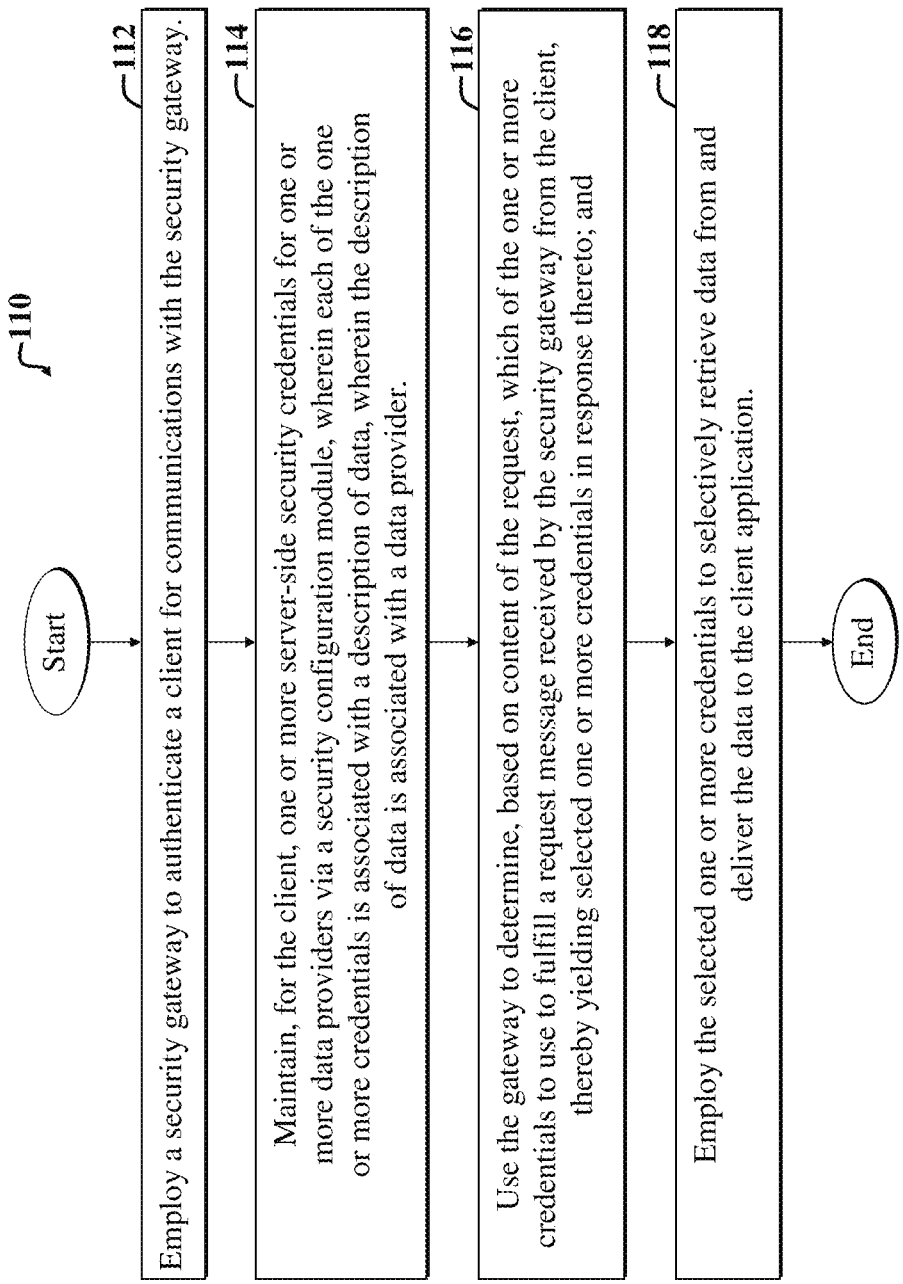
FIG. 5 is a flow diagram of a third example method implementable via the embodiments of FIGS. 1-2.

FIG. 5 is a flow diagram of a third example method 110 implementable via the embodiments of FIGS. 1-2. The third example method 110 facilitates securely connecting a client application with a content provider.

A first step 112 includes employing a security gateway to authenticate a client for communications with the security gateway.

A second step 114 includes maintaining, for the client, one or more server-side security credentials for one or more data providers via a security configuration module. Each of the one or more credentials is associated with a description of data, which in turn is associated with a data provider.

A third step 116 includes using the gateway to determine, based on content of the request, which of the one or more credentials to use to fulfill a request message received by the security gateway from the client, thereby yielding selected one or more credentials in response thereto.

A fourth step 118 includes employing the selected one or more credentials to selectively retrieve data from and deliver the data to the client application.

Note that the method 110 may be modified, without departing from the scope of the present teachings. For example, the method 110 may further include generating the request message when a UI control displayed in a UI display screen of a browser is selected, wherein the UI control is coupled to software functionality requiring access to data from the data provider. The description of data is stored, at least in part, in a common configuration module.

Figure 6:
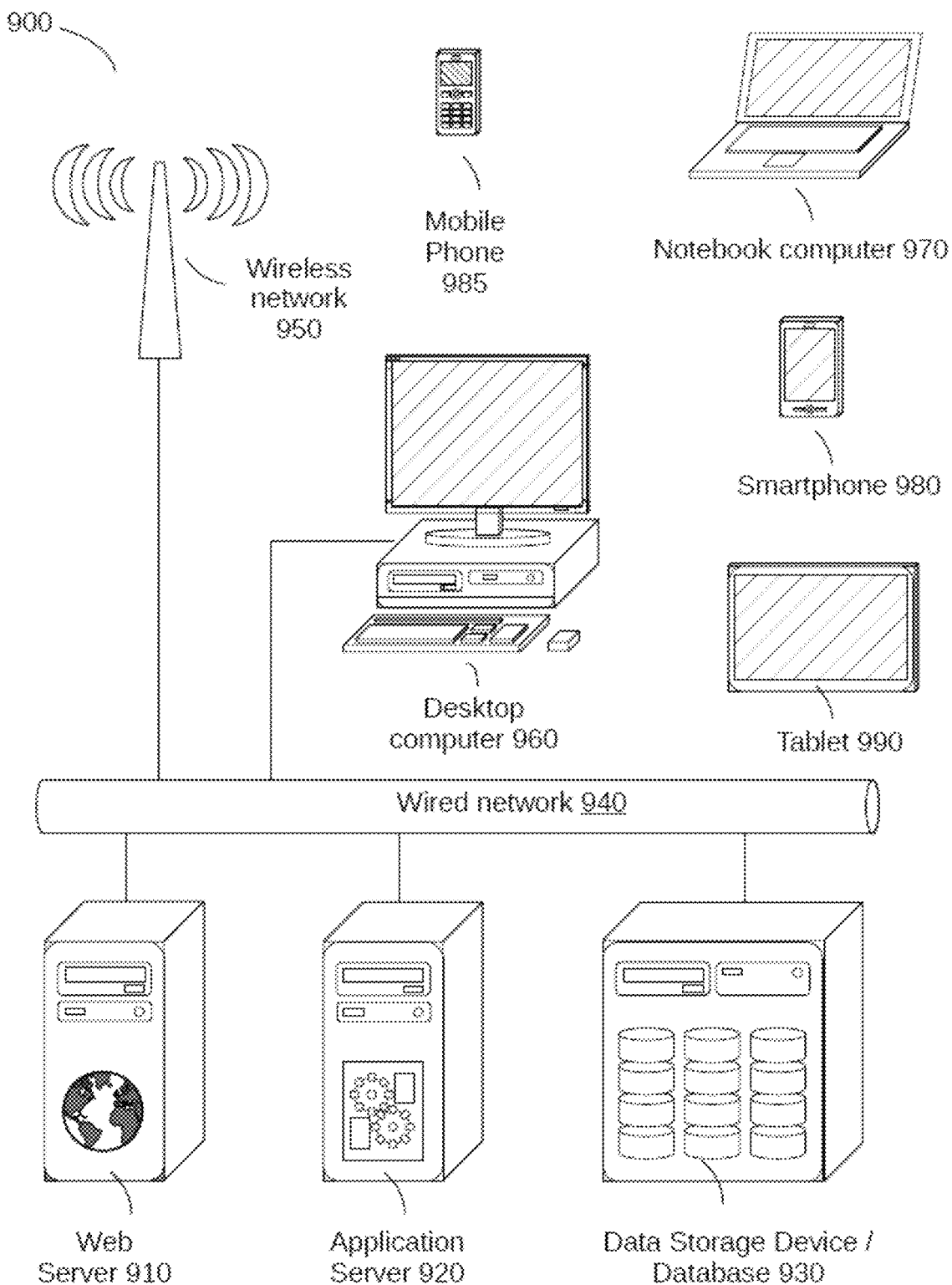
FIG. 6 is a general block diagram of a system and accompanying computing environment usable to implement the embodiments of FIGS. 1-5.
Figure 7:
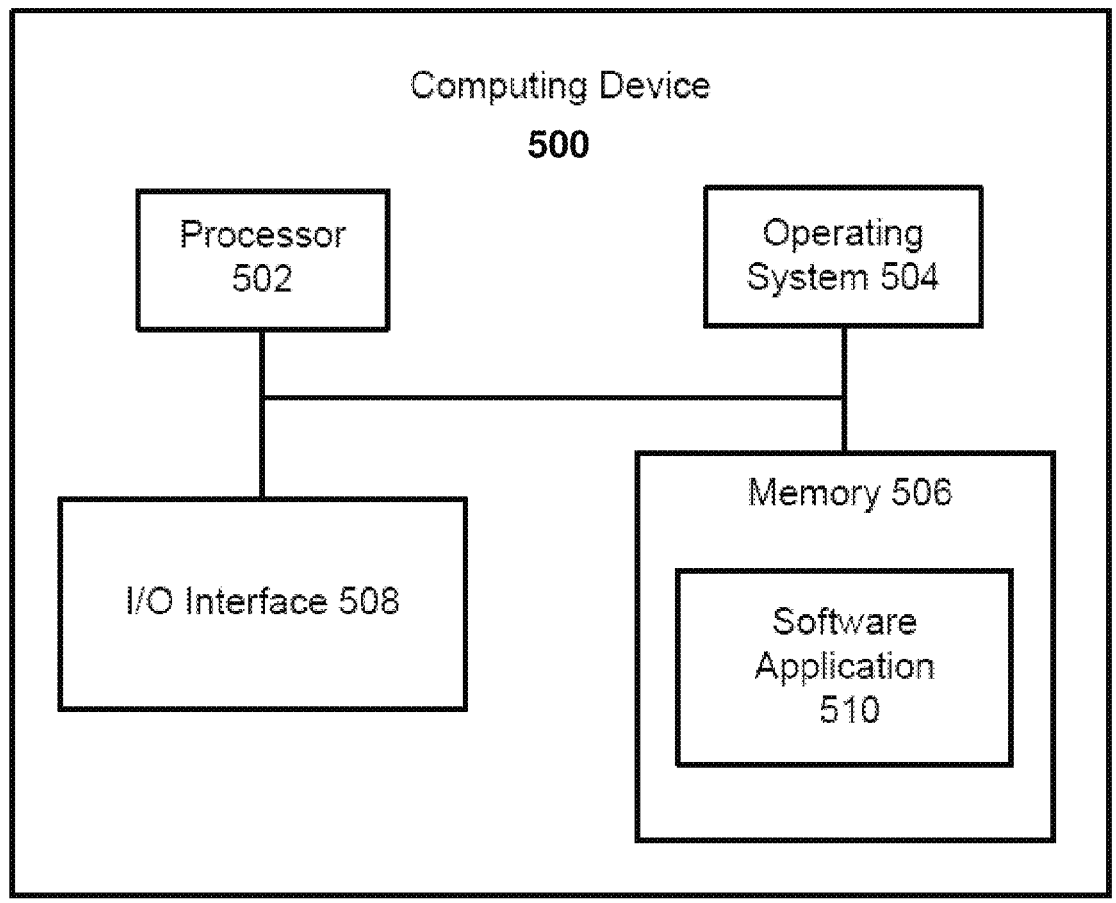
FIG. 7 is a general block diagram of a computing device usable to implement the embodiments of FIGS. 1-5.

FIG. 6 is a general block diagram of a system 900 and accompanying computing environment usable to implement the embodiments of FIG. 1-5. The example system 900 is capable of supporting or running various hardware and/or software modules and associated methods discussed with reference to FIG. 1-5. Note that certain embodiments may be implemented using one or more standalone applications (for example, residing in a user device) and/or one or more web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as Rich Site Summary (RSS) feeds of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computer.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system 900 is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

For example, with reference to FIGS. 2 and 6, the client system 12 of FIG. 1 may be implemented in whole or in part via one or more of the desktop computer 960, notebook computer 970, smartphone 980, mobile phone 985, tablet 990, of FIG. 6 and/or other computing devices. In a particular example embodiment, the computing devices 960-990 run browsers or mobile applications, e.g., the browser 16 of FIG. 2, which may be used to display UIs (e.g., via the UI display screen 18 of FIG. 2) for interacting with the business application(s) 46 and data providers 32, 64 of FIG. 2.

In the particular example embodiment of FIG. 2, the browser 16 of the client system 12 of FIG. 2 connects to the Internet, represented by the wired network 940 and/or wireless network 950 as shown in FIG. 6, to access one or more network-coupled servers, databases, and/or associated cloud-based functionality, which host the website 52, web application 46, data security gateway 24, data providers 32, 64, the security configuration module 28 (and accompanying credentials 66, 68), and the common configuration module 30 of FIG. 2.

In the particular example embodiment of FIG. 2, the website 52 and accompanying web application 46 are hosted by one or more web servers 910 of FIG. 6. The data security gateway 24, data providers 32, 64, the security configuration module 28 (and accompanying credentials 66, 68), and the common configuration module 30 of FIG. 2 run on one or more application servers 920 of FIG. 6.

Databases supported by the data providers 32, 64 of FIG. 2 are maintained via the data storage devices and/or databases 930 of FIG. 6. The data providers 32, 64 may represent backend database management systems that are hosted on the application server 920 of FIG. 6, but manage backend data stores maintained on the data storage devices and/or databases 930 of FIG. 6.

In the particular example embodiment of FIG. 2, UI display screens, e.g., the UI display screen 18 of FIG. 2, may be presented via the browser 16 of FIG. 2 and may include accompanying UI controls and associated options 50. Example options include options to browse, create, delete, define, upload, download, etc., folders, structures, and documents, etc., as maintained via the folder structures and documents.

Note that in the particular example embodiment, the browser 16 used by the client system 12 of FIG. 2, interfaces with web servers 910 shown in FIG. 6 to access websites 52 and accompanying webpage code 46, which is backed by applications, e.g., the server-side data security gateway 24 and data providers 32, 64 of FIG. 2.

The webpage code of the web servers 910 of FIG. 6 uses web services, APIs, and/or other interfacing mechanisms to communicate with the data security gateway application 24 of FIG. 2. With reference to FIGS. 1 and 6, the server system 14 may run entirely on one or more application servers 920 of FIG. 6.

Note that various embodiments discussed herein may provide substantial benefits in terms of enabling the sharing of secure data among disparate enterprise computing resources (e.g., software applications, which may include APIs, web services, database management systems, and other software applications) that may otherwise (in absence of the use of an embodiment using the authenticators and accompanying methods discussed herein) employ incompatible authentication technologies prohibiting secure intercommunications.

Accordingly, various embodiments provide new capabilities for efficient software integration, in part by uniquely leveraging a data security gateway and interfacing code for generating and selectively sharing tokens and associated credentials in a computing environment to facilitate access to data and/or functionality afforded by one or more secure data providers.

FIG. 5 is a general block diagram of a computing device 500 usable to implement the embodiments described herein. While the computing device 500 of FIG. 6 may be described as performing one or more of the steps in the embodiments herein. In other embodiments, any suitable component or combination of components of the computing device 500 or any suitable processor or processors associated with system 500 may facilitate performing the steps.

FIG. 5 illustrates a block diagram of an example computing system 500, which may be used for implementations described herein. For example, computing system 500 may be used to implement server devices 910, 920 of FIG. 6 as well as to perform the method implementations described herein.

In some implementations, computing system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing system 500 may be implemented by one or more processors or any combination of hardware devices, as well as any combination of hardware, software, firmware, etc.

For ease of illustration, FIG. 5 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing system 500 may not have all of the components shown and/or may have other elements including other types of components instead of, or in addition to, those shown herein.

Although the description has been described with respect to particular embodiments thereof, these particular embodiments are merely illustrative, and not restrictive. For example, while various embodiments discussed herein address use of a data security gateway to interface client applications with other enterprise applications and secure data providers, embodiments are not limited thereto. For example, embodiments may be employed to interface web applications that are not enterprise applications and to interface data providers with clients, where the data providers do not necessarily require authentication for data access thereto, but may require input of other configuration information, besides security-related information, e.g., credentials. A data gateway as discussed herein may be extended to handle delivery of other types of configuration information, and not necessarily security information, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for securely connecting a client application with a data provider, the method comprising:

storing one or more credentials associated with a client application as authentication information that is accessible to a server via a security gateway, wherein the one or more credentials are usable to access data from a first data provider and data from a second data provider;

accessing particular data associations between the one or more credentials for the first data provider and the second data provider and respective data descriptions, wherein the respective data descriptions describe and characterize types and nature of data available from the first data provider and the second data provider;

receiving a request message from the client application, wherein the request message includes a token that indicates a web application used by the client application;

determining security information required to fulfill the request message, by:
  comparing the request message with the respective data descriptions associated with common configuration data for the first data provider and the second data provider, and
  selecting first credentials associated with the first data provider or second credentials associated with the second data provider,
  wherein the common configuration data includes information about handshake protocols to be used in communication with the first data provider or the second data provider;

loading the security information associated with the client application; and using the security information, the particular data associations, and web application context information indicating a type of currently displayed information for the web application, to selectively retrieve and deliver data from the first data provider or the second data provider to the client application.

2. The method of claim 1, wherein receiving further includes:
  receiving the request message at the security gateway running on a server that is in communication with the first data provider and the second data provider.

3. The method of claim 2, wherein the request message is associated with one or more User Interface (UI) elements of a UI display screen presented via a browser.

4. The method of claim 3, wherein the browser represents the client application.

5. The method of claim 3, wherein the browser communicates with the client application, which includes the web application.

6. The method of claim 1, wherein the common configuration data includes a first data description associated with first credentials for said first data provider and a second data description associated with second credentials for said second data provider.

7. The method of claim 6, wherein the common configuration data includes:
  information specifying a data provider for which the security information is usable to log into the data provider.

8. The method of claim 7, wherein the security information includes a password.

9. The method of claim 1, further including:
  connecting a UI element of a website displayed in a UI display screen of the client application to the security gateway;
  connecting the security gateway to an enterprise application;
  loading the security information from a security configuration module into the security gateway, wherein the security information includes one or more credentials associated with a user of the client application;
  using the security gateway to issue a call to the first data provider to transfer data responsive to the request message to the client application; and
  using the client application to populate the UI element with the data that has been transferred from the first data provider.

10. A tangible processor-readable storage device including instructions executable by one or more processors for:
  storing one or more credentials associated with a client application as authentication information that is accessible to a server via a security gateway, wherein the one or more credentials are usable to access data from a first data provider and data from a second data provider;
  accessing particular data associations between the one or more credentials for the first data provider and the second data provider and respective data descriptions, wherein the respective data descriptions describe and characterize types and nature of data available from the first data provider and the second data provider;
  receiving a request message from the client application, wherein the request message includes a token that indicates a web application used by the client application;
  determine security information required to fulfill the request message, by:
    comparing the request message with the respective data descriptions associated with common configuration data for the first data provider and the second data provider, and
    selecting first credentials associated with the first data provider or second credentials associated with the second data provider,
    wherein the common configuration data includes information about handshake protocols to be used in communication with the first data provider or the second data provider;
  loading the security information associated with the client application; and
  using the security information, the particular data associations and web application context information indicating a type of currently displayed information for the web application, to selectively retrieve and deliver data from the first data provider or the second data provider to the client application.

11. The tangible processor-readable storage device of claim 10, wherein receiving further includes:
  receiving the request message at the security gateway running on a server that is in communication with the first data provider and the second data provider.

12. The tangible processor-readable storage device of claim 11, wherein the request message is associated with one or more User Interface (UI) elements of a UI display screen presented via a browser.

13. The tangible processor-readable storage device of claim 12, wherein the browser represents the client application.

14. The tangible processor-readable storage device of claim 12, wherein the browser communicates with the client application, which includes a web application.

15. The tangible processor-readable storage device of claim 10, wherein
  the common configuration data includes a first data description associated with first credentials for said first data provider and a second data description associated with second credentials for said second data provider.

16. The tangible processor-readable storage device of claim 15, wherein analyzing the request message includes:

using content of the request message to determine a common configuration to associate with the request message.

17. The tangible processor-readable storage device of claim 16, wherein the common configuration data includes: information specifying a data provider for which the security information is usable to log into the data provider.

18. The tangible processor-readable storage device of claim 17, wherein the security information includes a password.

19. An apparatus for facilitating authenticating a client application for securely connecting a client application with a first data provider and a second data provider, the apparatus comprising:
one or more processors;
a tangible processor-readable storage device including instructions for:
storing one or more credentials associated with a client application as authentication information that is accessible to a server via a security gateway, wherein the one or more credentials are usable to access data from a first data provider and data from a second data provider;
accessing particular data associations between the one or more credentials for the first data provider and the second data provider and respective data descriptions, wherein the respective data descriptions describe and characterize types and nature of data available from the first data provider and the second data provider;
receiving a request message from the client application, wherein the request message includes a token that indicates a web application used by the client application;
loading the authentication information associated with the client application based on analysis of the request message, the analysis including comparing the request message with common configuration data for the first and second data providers to select first credentials associated with the first data provider or select second credentials associated with the second data provider, wherein the common configuration data includes information about handshake protocols to be used in communication with the first data provider or the second data provider; and
using the security information, the particular data associations, and web application context information indicating a type of currently displayed information for the web application, to selectively retrieve and deliver data from the first data provider or the second data provider to the client application.

* * * * *